HENRY H. ROGERS.
Improvement in Distilling Naphtha and other Hydrocarbon Liquids.
No. 120,539. Patented Oct. 31, 1871.
4 Sheets--Sheet 1.
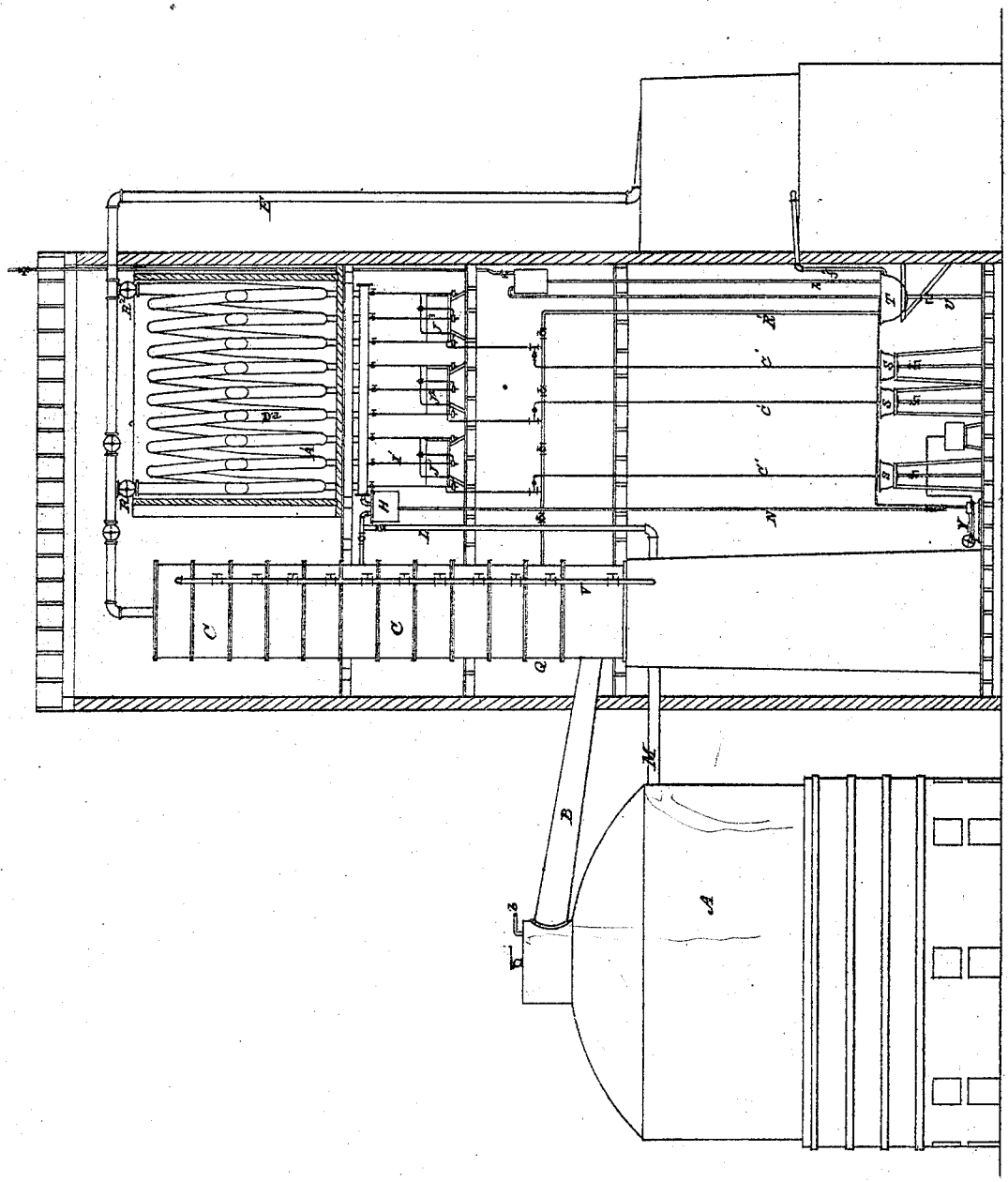

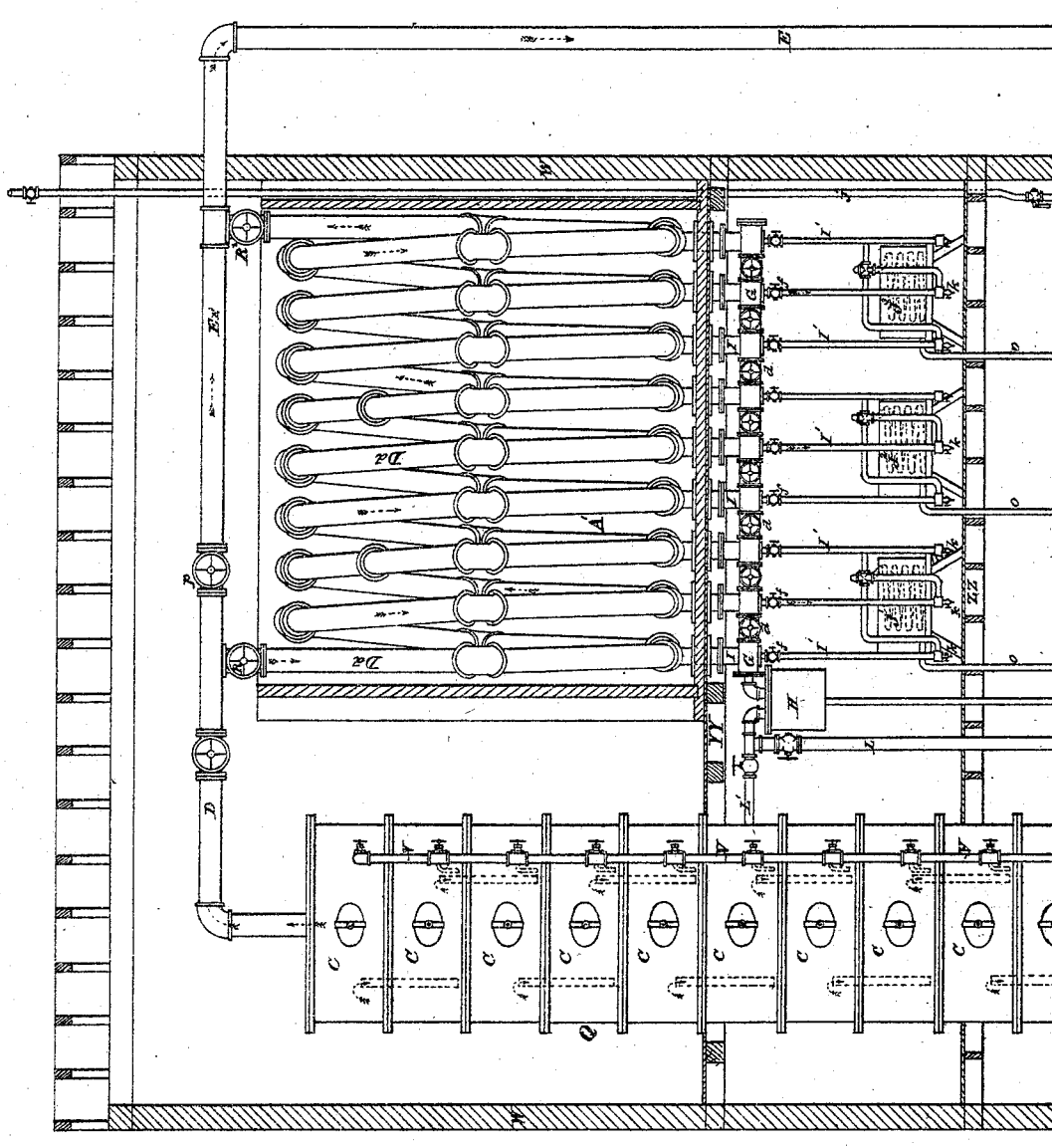

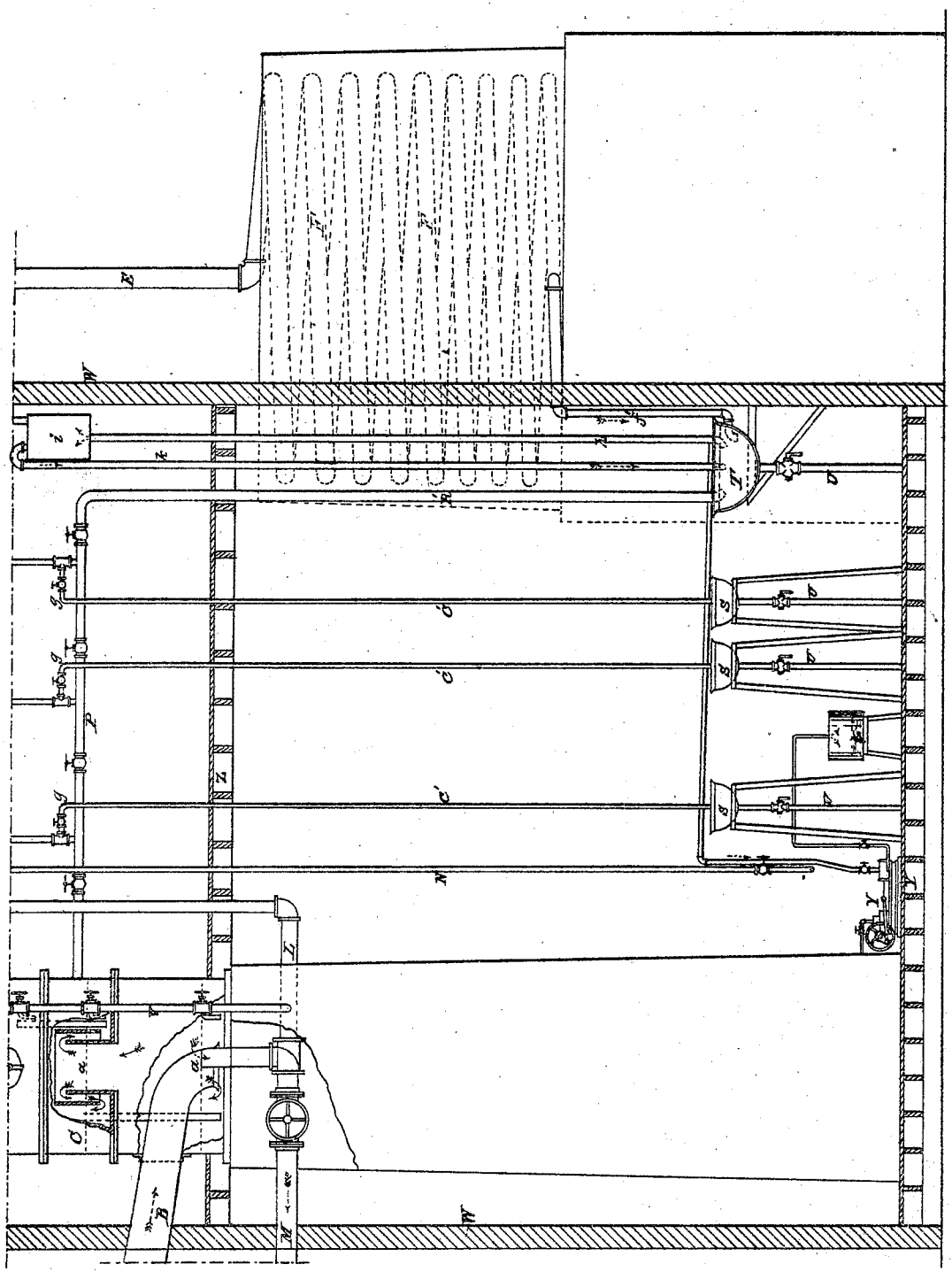

HENRY H. ROGERS.
Improvement in Distilling Naphtha and other Hydrocarbon Liquids.
No. 120,539.  Patented Oct. 31, 1871.
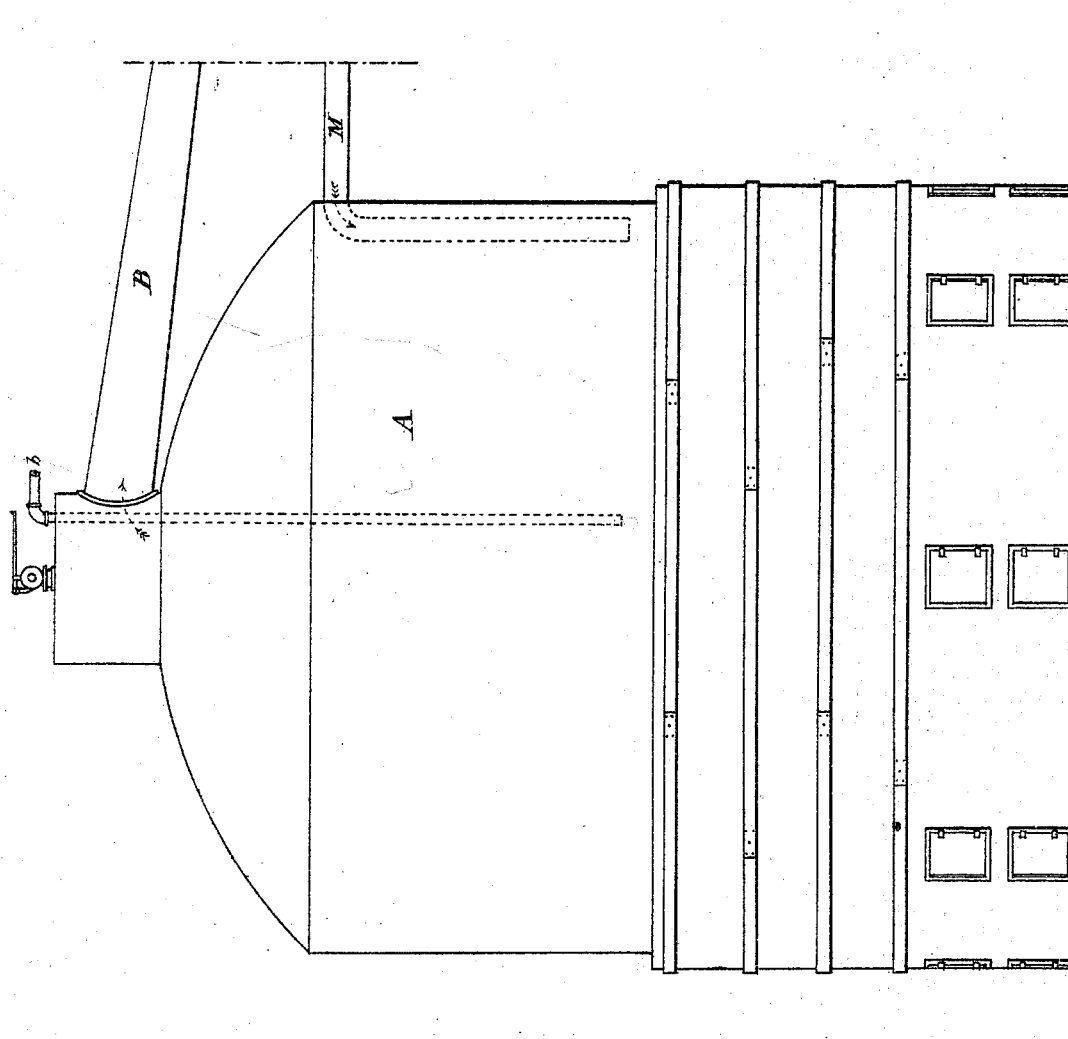

UNITED STATES PATENT OFFICE.

HENRY H. ROGERS, OF BROOKLYN, NEW YORK, ASSIGNOR TO THE CHARLES PRATT MANUFACTURING COMPANY, OF NEW YORK CITY.

IMPROVEMENT IN DISTILLING NAPHTHA AND OTHER HYDROCARBON LIQUIDS.

Specification forming part of Letters Patent No. 120,539, dated October 31, 1871.

*To all whom it may concern:*

Be it known that I, HENRY H. ROGERS, of Brooklyn, in the county of Kings and State of New York, have made a new and useful Improvement in Distilling Naphtha and other Hydrocarbon Liquids; and I hereby declare the following to be a full and exact description of the same, reference being had to the accompanying drawing which forms a part of this specification, in which—

Sheet 1 shows a side elevation of the apparatus used in carrying out my invention, and Sheets 2, 3, and 4, elevations and partial sections of the same on an enlarged scale.

Petroleum and other hydrocarbon liquids are, as they exist naturally, or as produced by distillation, of a very complex character, varying especially in the temperature at which they are converted into vapors, and in their specific gravities. It is very important in the arts that they be separated as near as possible from each other. As these oils are soluble the one in the other, their separation is difficult, as it must be effected by the difference in their boiling-points and the different degrees of cold required to condense their vapors. It is well known that when two or more liquids of different boiling-points are dissolved the one in the other, when heated so as to boil, a mixed vapor will be formed, partly of the lighter and partly of the heavier vapors. When this mixed vapor is condensed slowly, the heavier vapors are first condensed, mixed, however, with a portion of the lighter. By repeating the operation of vaporizing and condensing many times an almost perfect separation of all the various products contained in petroleum may be effected. My invention consists in an apparatus for separating volatile hydrocarbons by repeated vaporization and condensation. The operation is continuous, and what is equivalent to a large number of fractional distillations is accomplished during a single distillation. The apparatus which I use is, in many respects, similar to what is known as the column-still for distilling alcoholic spirits, but modified in all the details, so as to make it available for distilling oils. In the spirit-still it is only required to separate two principal liquids—alcohol and water. But in the oil-still a long series of liquids is to be separated.

The following description will enable any one to make and use my invention.

The naphtha or oil may be fed in either continuously or intermittently. Fresh oil may be fed into the still and into the column. A is a retort, in which is placed the naphtha or other liquor to be distilled, and which is filled by means of the charge-pipe $b$. B is a neck or pipe, which connects the retort with the column Q, and through which the vapor passes from the retort to the lower compartment of the column during the process of distillation. The column Q is composed of a series of compartments or sections, C C, &c., placed one above the other, so constructed that each will hold a certain quantity of liquor similar to that placed in the retort, and so arranged that the liquor in each of such compartments will overflow into the one beneath it when such liquor reaches a certain level. These compartments are also constructed in such a manner that the vapor, in passing through this column, is forced through the liquor contained in each compartment. D is a pipe leading from the top of the column, through which the vapor passes on leaving the last or upper compartment. V is a pipe, by means of which the compartments C C, &c., are filled with the liquor, and is fitted with suitable stop-valves, so that any desired number of the compartments may be filled. The same pipe may be used to draw off the liquor from the various compartments when it is desired to do so. A' is a tank containing water, in which is immersed the worm composed of the pipes $D^d$ $D^d$. This worm is connected at one end with the pipe D by the stop-valve R, and at the other end with the pipe E by the stop-valve $R^2$. $p$ is a stop-valve, which may be used to prevent the passage of the vapor into the pipe $E^e$, and thus force it down into and through the pipes $D^d$ $D^d$, &c. $E^e$ is a pipe through which the vapor may pass when it is not desired to use the worm composed of the pipes $D^d$ $D^d$, &c.; in which case the stop-valve $p$ is opened and the stop-valve R closed. E is a pipe leading to the worm F, by means of which the vapor passing from the pipes $D^d$ $D^d$ or the pipe $E^e$ is conducted to said worm F. The pipes I I I, &c., are connected with the lower ends of each of the pipes $D^d$ $D^d$, and are used for the purpose of drawing off the liquor condensed in such pipes and conducting it into the pipe G. The pipe G is fitted with separating-valves, $d$, which are placed between each entrance of the pipes I. Any number of these valves may be opened or shut, as may be desired. I' I' I' are pipes leading from the pipe G to the auxiliary or cooling-worms $J^1$ $J^2$ $J^3$, and are tapped into the pipe G directly underneath the entrance of the pipes I I I, &c. These pipes are also fitted with stop-valves $f$, which may be closed when it is not desired to pass the condensed liquor through the cooling-worms $J^1$ $J^2$ $J^3$, or either of them. The worms $J^1$ $J^2$ $J^3$ are used for the purpose of cooling the condensed liquor which is conducted to them by the pipes I′ I′ I′, &c. The pipes O O are discharges for the worms $J^1$ $J^2$ $J^3$, through which the cooled liquor is conducted to the pipe P, or drawn off into the running pans S S S by means of the pipes C′ C′ C′. The valves $g$, connecting the pipes O with the pipes C′, may be closed, when the cooled liquor passing from worms $J^1$ $J^2$ $J^3$ may be conducted by the pipe P back into the lower compartments of the column Q, or run back into the retort by the pipes L and M, or carried to the main running-pan T by the pipe $R^1$. H is a receiver or water-trap, through which the condensed liquor coming from the pipe G passes when it is desired to send it back to the retort by means of the pipes L and M, or into the column through the pipe L′. In passing through this receiver or water-trap H all the water that may be in the oil or liquor is collected in the bottom of such receptacle H, and may be drawn off by means of the pipe N. Each of the pipes I may be extended below the entrance to the worms $J^1$, &c., and may be fitted with valves K, so that any water contained in the liquor will be collected in such pipes and may be drawn off by the valves K. $E^e$ is a pipe through which the vapor passes when it is not desired that it should pass through the pipes $D^d$ $D^d$, &c. E is a continuation of the pipe $E^e$, connecting it with the worm F, and through which the vapors which have not been condensed in the pipes $D^d$ will also pass to said worm F. $h$ is a pipe passing from the upper portion of the main running-pan T to allow the receiver $i$, through which any vapor that may not have been condensed in the worm F is drawn off, and may be allowed to escape into the open air through the escape-pipe $j$, or be carried through the pipe $k$ and afterward condensed by atmospheric pressure. U U are pipes for the purpose of conducting the distilled liquor from the running-pans to the receiving-tanks or other receptacles. The retort A having been filled to the desired height with the naphtha or other liquid to be distilled, the compartments or sections C C, &c., of the column Q are also filled to about the level designated by the line $a$ with the same or a similar liquor to that placed in the retort. Upon the liquor in the retort being heated by a fire built under the same, or other suitable means, the vapor rising from the heated liquor will pass off by the neck or pipe B and be compelled to force its way through the liquor contained in the compartment C at the lower end of the column Q, which will retain some of the less volatile portions of the vapor, and the vapor will also evaporate and carry off the more volatile portions of said liquor contained in such compartment. This operation of condensation and evaporation is repeated in each of the compartments or sections C. The liquor contained in such compartments will also tend to remove from the vapor any impurities or foreign matter that may be carried in it from the retort.

When the vapor reaches the last or top compartment of the column it will pass off by the pipe D, and the stop-valve $p$, being closed, is forced down into the worm composed of the pipes $D^d$ $D^d$, &c., which worm being immersed in the tank of water A′, the less volatile portions are here condensed in the different pipes, and the condensed liquor drawn off, by the pipes I and I′, into the auxiliary or cooling-worms $J^1$ $J^2$ $J^3$; or, if it is desired to run such liquor back into the column by means of the pipe L′, or into the retort by way of the pipes L and M, the valves in the pipes I′ are closed, and any desired number of the separating-valves in the pipe G opened, and the worms $J^1$ $J^2$ $J^3$ not used. The liquor condensed in the pipes $D^d$ will then be collected in the pipe G, and, after passing through the receiver or water-trap H, where any water that may be contained in it will be collected, it may be conducted either into the column or retort to be redistilled, as may be desired. Or, if it is desired to conduct back to the column or retort only the liquor from a portion of the pipes $D^d$—for instance, that which would pass to the worm $J^1$, or to the worms $J^1$ and $J^2$—this may be accomplished by closing the requisite number of division-valves in the pipe G. When it is desired to cool the liquor before taking it back to the column or retort it may be allowed to pass through the worms $J^1$ $J^2$ $J^3$, and be conducted back to the column or retort by the pipes O O and P.

The worms $J^1$ $J^2$ $J^3$ are so arranged that the liquor which is condensed in the pipes $D^d$ $D^d$ will be conducted to them in different grades or qualities, as $J^1$, receiving the liquor from the first three of the series of pipes $D^d$, &c., will have a lower grade than that which is received by the worm $J^2$, which receives what is condensed in the next three pipes of the worm, and that received by $J^3$ will be of a still higher grade. By this means different grades of oil or other liquors may be obtained from the same worm and during the same operation, and the more volatile vapor which has not been condensed in the pipes $D^d$ $D^d$, &c., will pass from them through the valve $R^2$ into the pipe E, and be conducted into the worm F, from which the condensed liquor is drawn off into the running-pan T.

When it is desired to run only the highest grade of liquor all that is condensed in the pipes $D^d$ $D^d$ may be run back into the column or retort and again distilled, the vapor which is sufficiently volatile not to be condensed in the pipes $D^d$ and is conducted into the worm F and there condensed only being drawn off for use; or, in the same manner, what is condensed and run into $J^3$ and $J^2$ may be drawn off for use, and what is condensed in $J^1$ conducted back to the column or retort to be distilled over again. Also, by running the liquor through the cooling-worms $J^1$, &c., before conducting it back to the column, (the lower compartments thereof,) it will have a tendency to cool the contents of such column and thus facilitate the process of distillation.

If it be desired to use only the worm F for the purpose of condensing the vapor after it has passed up through the column Q the valve $p$ may be opened and the valves R R$^2$ closed, when the vapor will pass through the pipe E $e$ directly to the pipe E and worm F, in which case the worm D$^d$ is not used.

The condenser F is for the purpose of liquefying such vapors as pass off from the condenser and separator. These require often both a very low temperature and pressure. For the purpose of securing a low temperature the coil in F may be surrounded with ice or cooled by any artificial means of refrigeration. The pressure required is produced by the pump Y, acting through the tanks Z Z'. If, after the application of a suitable degree of pressure and cold, any gases or vapors remain still uncondensed, they are passed off into the air or burned.

The pans J are covered so as to exclude the air, and the pump Y is both a vacuum and pressure-pump, so that the vapors may be drawn from the still and separator when necessary and forced into the tanks Z and Z', where they are condensed still further, and finally the whole of the condensable and very volatile materials condensed in F. By this process the products are uniform in constitution and gravity from the heaviest to the lightest, as they should be when used.

It will be observed that the still, the column, and the condenser, with its necessary appendages, while they work together to effect the result, are each regulated independently of the other. The office of the still is simply to generate the mingled hydrocarbon-vapors very much the same as the common oil-still as now used and throw these vapors into the column. In their passage through the column they are gradually separated into light and heavy oils. The complete separation into their ultimate products is effected by the condensers. In this respect my apparatus is essentially different from the column-stills for spirits, which have mainly to remove more or less water from the spirits. This difference will plainly appear if any one should try to apply any of the known column-stills for spirits to the separation of hydrocarbon-oils.

This apparatus is especially intended for the distillation of naphtha and for separating the heavy from the light hydrocarbons. In the ordinary method of distilling petroleum the portion cut off as naphtha is of little value. To make this product useful in the arts it is necessary to have it separated into liquids of as nearly as possible the same boiling-point. By my method of distilling the commercial articles known as benzine, gasoline, chimogen, rhigoline, carbon spirits, and the like, are products of perfectly uniform constitution, and these light products are entirely separated from the lubricating-oil and lamp-oil, so that these heavier oils are entirely freed from light oils, which would make them dangerous to use.

Long experience has proved that the presence of variable quantities of light or easily-vaporizable oils mixed with the lamp-oil often sold as kerosene is the cause of the many fatal accidents from fires and explosions.

The heavy oils which remain in the still may be finished off in a still of the ordinary construction.

Having thus described my invention, what I claim, and desire to secure by Letters Patent of the United States, is—

1. The apparatus herein described for separating volatile hydrocarbons, composed of a still, a column, and a condensing and separating apparatus, each constructed so as to operate substantially as herein set forth.

2. The column Q, in combination with the condensing and separating apparatus, as set forth.

3. The condensing and separating apparatus, composed of the tank A', coils D$^d$, pipes I, pipe G, and valves $d$, arranged and combined substantially as set forth and described.

4. The pipes I', in combination with the auxiliary or cooling-worms J$^1$ J$^2$ J$^3$, as and for the purpose set forth.

5. The pipe G, in combination with water-tank H and pipes L and L'.

6. The combination of the worm F with the condensing and separating apparatus composed of tank A' and coils D$^d$.

7. The combination of the running-pans with the condensing and separating apparatus, as set forth.

8. The pipes D, E$^c$, and E with valves P, R, and R$^2$, arranged to operate as described.

9. The pipe V, connected with apartments C C C, &c., so as to fill and draw off the liquid from the cooler, as described.

HENRY H. ROGERS.

Witnesses:
GEO. E. BACON,
CHAS. E. BEELER. (47)